United States Patent
Miller et al.

(10) Patent No.: US 9,032,397 B2
(45) Date of Patent: May 12, 2015

(54) VIRTUAL MACHINE MIGRATION WITH DIRECT PHYSICAL ACCESS CONTROL

(75) Inventors: Troy Miller, Plano, TX (US); Mark A. Criss, McKinney, TX (US); Jerry James Harrow, Jr., Brookline, NH (US); Thomas Turicchi, Dallas, TX (US); Michael Wisner, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1698 days.

(21) Appl. No.: 12/128,511

(22) Filed: May 28, 2008

(65) Prior Publication Data

US 2009/0300606 A1 Dec. 3, 2009

(51) Int. Cl.
G06F 9/455 (2006.01)
G06F 9/46 (2006.01)
G06F 9/44 (2006.01)
G06F 3/00 (2006.01)
G06F 21/00 (2013.01)
G06F 9/48 (2006.01)

(52) U.S. Cl.
CPC .......... G06F 9/4856 (2013.01); G06F 9/45558 (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 7,007,183 B2 * | 2/2006 | Rawson, III | 713/324 |
| 7,467,381 B2 * | 12/2008 | Madukkarumukumana et al. | 718/1 |
| 7,743,389 B2 * | 6/2010 | Mahalingam et al. | 718/104 |
| 7,752,635 B2 * | 7/2010 | Lewites | 719/327 |
| 7,761,612 B2 * | 7/2010 | Corry et al. | 710/8 |
| 7,793,287 B2 * | 9/2010 | Lowell | 718/1 |
| 7,945,436 B2 * | 5/2011 | Ang et al. | 703/23 |
| 2004/0010787 A1 | 1/2004 | Traut et al. | |
| 2005/0076155 A1 * | 4/2005 | Lowell | 710/1 |
| 2005/0235123 A1 | 10/2005 | Zimmer et al. | |
| 2005/0251802 A1 | 11/2005 | Bozek et al. | |
| 2005/0268298 A1 | 12/2005 | Hunt et al. | |
| 2006/0005189 A1 | 1/2006 | Vega et al. | |
| 2006/0288189 A1 | 12/2006 | Seth et al. | |
| 2007/0112999 A1 * | 5/2007 | Oney et al. | 711/6 |
| 2007/0169121 A1 | 7/2007 | Hunt et al. | |
| 2007/0204265 A1 | 8/2007 | Oshins | |
| 2007/0220121 A1 | 9/2007 | Suwarna | |
| 2007/0266383 A1 | 11/2007 | White | |
| 2007/0283348 A1 | 12/2007 | White | |
| 2008/0294808 A1 * | 11/2008 | Mahalingam et al. | 710/26 |
| 2009/0164990 A1 * | 6/2009 | Ben-Yehuda et al. | 718/1 |
| 2009/0249366 A1 * | 10/2009 | Sen et al. | 719/327 |

\* cited by examiner

*Primary Examiner* — Meng An
*Assistant Examiner* — Bing Zhao
(74) *Attorney, Agent, or Firm* — Koestner Bertani LLP

(57) ABSTRACT

A data processing system facilitates virtual machine migration with direct physical access control. The illustrative data processing system comprises a software-programmable trap control associated with hardware registers of a computer that selectively vectors execution control of a virtual machine (VM) between a host and a guest. The data processing system further comprises a logic which is configured for execution on the computer that programs the trap control to enable the virtual machine to directly access the hardware registers when the virtual machine is not migrated and to revoke direct access of the hardware registers in preparation for virtual machine migration.

12 Claims, 8 Drawing Sheets

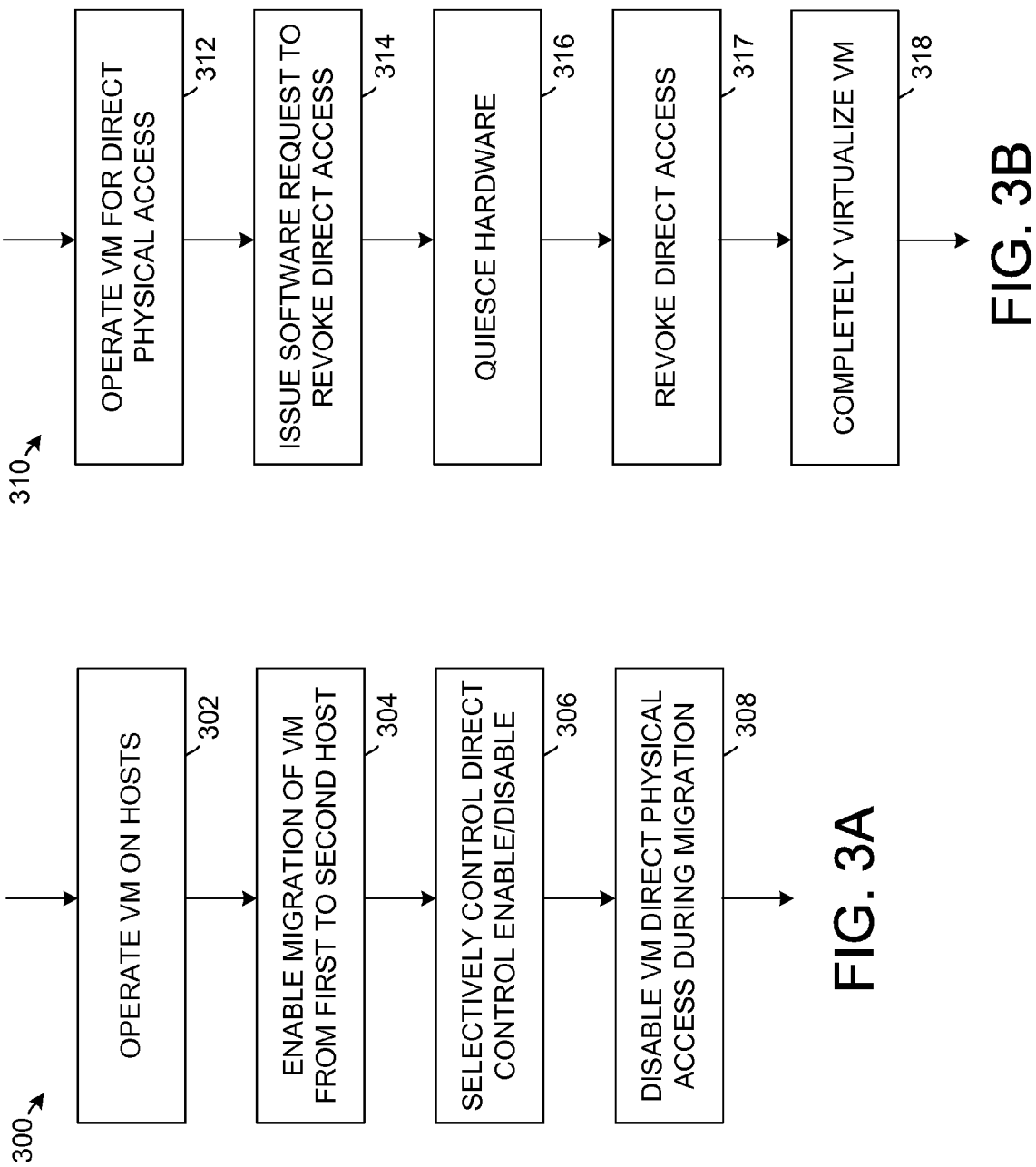

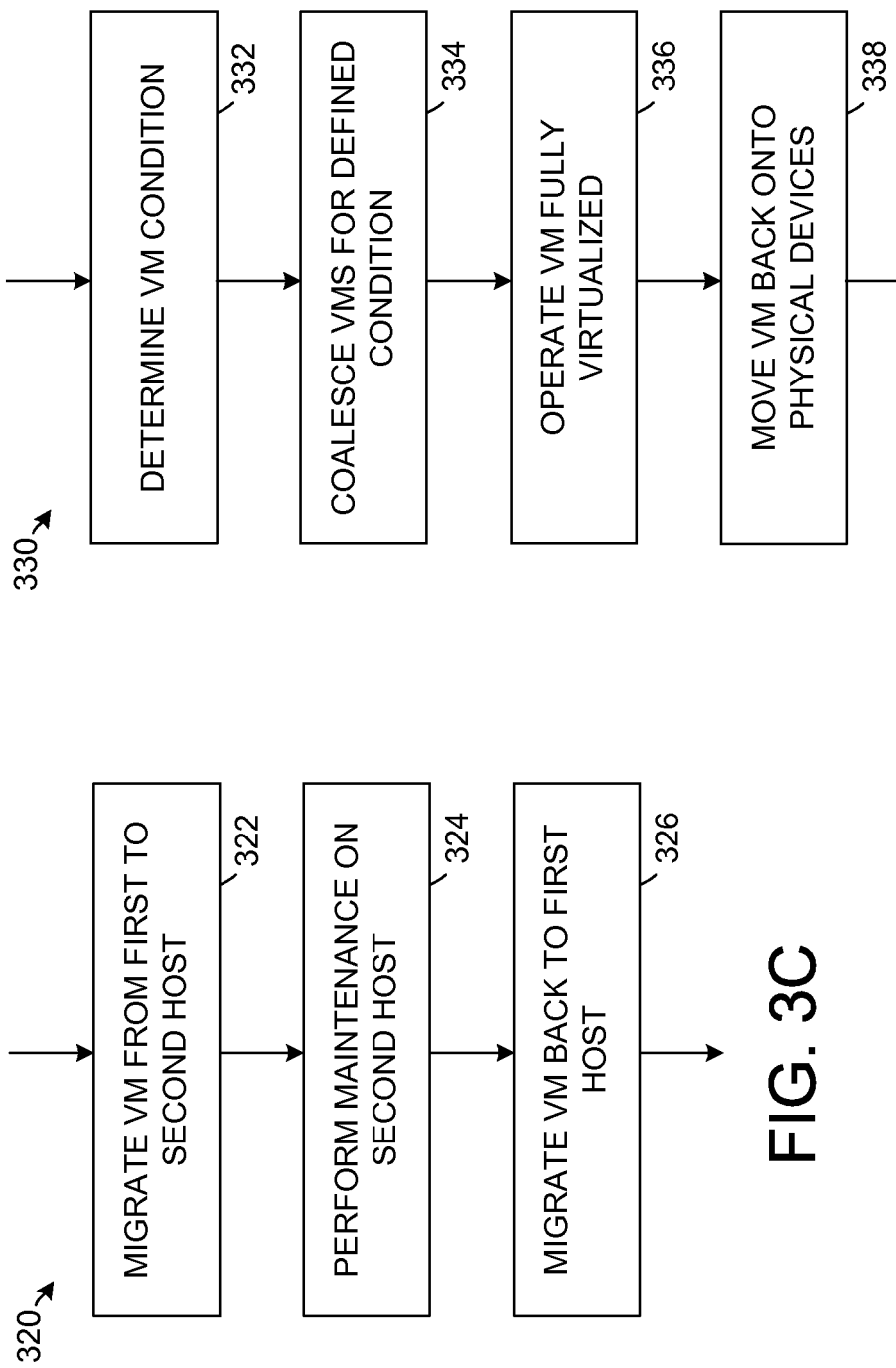

VIRTUAL MACHINE MIGRATION WITH DIRECT PHYSICAL ACCESS CONTROL

BACKGROUND

Virtual machine technology is used to create and concurrently run one or more guest operating systems on a physical device. One or more virtual machines can operate on a single host computing system, each including an operating system with concurrent applications.

One aspect of virtualization can be the migration of virtual machine from one host system to another, for example to manage or balance the load across physical devices in a system, address faults or failures in a host system, address temporary unavailability of resources in the system, perform maintenance, and the like.

SUMMARY

An embodiment of a data processing system facilitates virtual machine migration with direct physical access control. The illustrative data processing system comprises a software-programmable trap control associated with hardware registers of a computer that selectively vectors execution control of a virtual machine (VM) between a host and a guest. The data processing system further comprises a logic which is configured for execution on the computer that programs the trap control to enable the virtual machine to directly access the hardware registers when the virtual machine is not migrated and to revoke direct access of the hardware registers in preparation for virtual machine migration.

BRIEF DESCRIPTION OF THE DRAWINGS

Embodiments of the invention relating to both structure and method of operation may best be understood by referring to the following description and accompanying drawings:

FIGS. 3A through 3G are flow charts illustrating one or more embodiments or aspects of a computer-executed method that facilitates virtual machine migration with direct physical access control.

DETAILED DESCRIPTION

In several system and method embodiments, structures and techniques enable virtual machine (VM) migration after physical access is allowed in a virtual machine.

Virtual machines can be implemented to enable migration between virtual machine hosts by disallowing direct access to physical resources. For performance reasons direct access is granted for input/output (I/O) access, translation lookaside buffer (TLB) page tables, and the like for virtual machines. Once direct access is allowed, migration is no longer allowed due to the possibility of introducing error. The illustrative systems and methods revoke the direct physical access and allow migration of the virtual machine to be performed.

By enabling direct physical access to hardware registers in a revocable manner, a virtual machine can be migrated once the direct access is revoked using various methods of virtual machine migration. While the virtual machine is not currently migrated, the virtual machine can continue to exploit direct physical access which enables much higher performance for a deployed workload in the virtual machine. If such direct physical access is unavailable, virtual machines with performance requirements that demand direct access to physical devices cannot be migrated. The structures and systems disclosed herein enable migration of such high-performance virtual machines, further enabling zero-downtime maintenance, optimization of physical resource usage, and increases in the manageability and efficiency for virtual machines that exploit direct access to physical devices.

Although typical virtualized systems can allow direct physical access, such systems have disallowed migration of a virtual machine to another virtual machine host, preventing data center operations from being optimized because the virtual machine is tied to the virtual machine host and thus cannot be moved to reallocate or free servers to be retired.

Conversely, typical virtualized systems that support migration have not allowed direct physical access, leading to diminished performance since input/output (I/O) intensive workloads can experience overheads in excess of 80% making the virtual machine operate as a platform that is unacceptable for deploying certain workload types such operations for database applications.

Figure 1A:
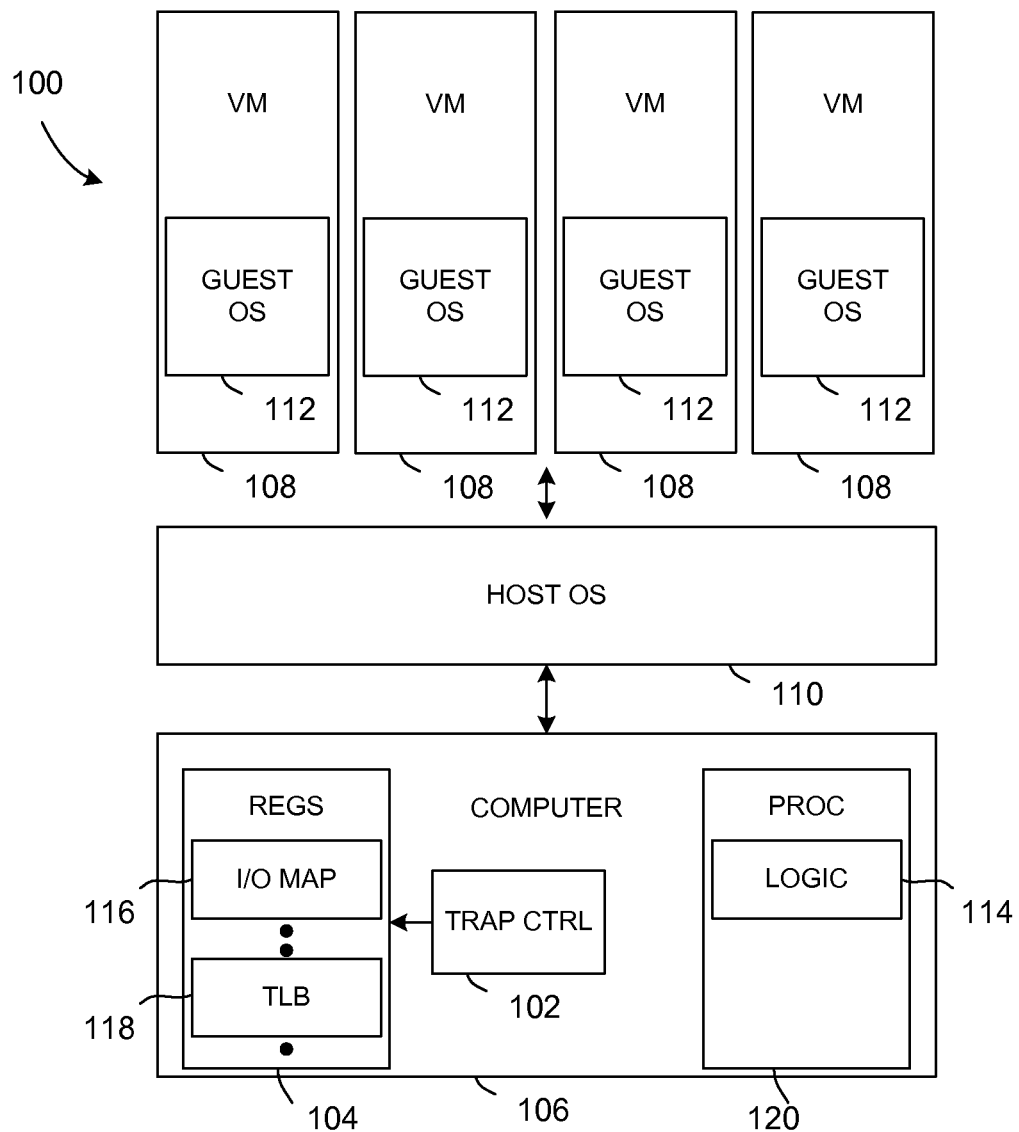
FIGS. 1A and 1B are schematic block diagrams which depict embodiments of a data processing system that facilitate virtual machine migration with direct physical access control.

Referring to FIG. 1A, a schematic block diagram illustrates an embodiment of a data processing system 100 that facilitates virtual machine migration with direct physical access control. The illustrative data processing system 100 comprises a software-programmable trap control 102 associated with hardware registers 104 of a computer 106 that selectively vectors execution control of a virtual machine (VM) 108 between a host 110 and a guest 112. The data processing system 100 further comprises a logic 114 which is configured for execution on the computer 106 that programs the trap control 102 to enable the virtual machine 108 to directly access the hardware registers 104 when the virtual machine 108 is not migrated and to revoke direct access of the hardware registers 104 in preparation for virtual machine migration.

The trap control 102 can be implemented as computer hardware for functional elements such as input/output (I/O) mapping registers, translation lookaside buffer (TLB) page tables, and the like, which are enhanced to enable selectable control between full virtualization and high-performance direct access under software management. For example, in one operating mode the hardware can be set to enable a virtual machine to directly access the I/O registers for performance, but then upon software request allow the I/O card to be quiesced and the direct physical access of the I/O registers revoked so that the virtual machine is completely virtualized. After direct physical access to the I/O registers is revoked, the trap control hardware causes the processor to trap such that the host operating system intercepts input and output traffic from the guest once again.

A similar technique can be used by the processor to enable revoking of the direct physical access to the TLB page table entries, thus ensuring that only memory which is used is copied to the target virtual machine host for the virtual machine migration.

The trap control 102 can be selectively software-programmable to control enablement and disablement of direct physical access of functional blocks such as input/output I/O mapping registers 116, translation lookaside buffer (TLB) page tables 118, and others for the virtual machine 108.

The logic 114 can be further configured to operate the virtual machine 108 for direct physical access, then issue a software request to revoke the direct physical access and respond to the issued software request by quiescing hardware and revoking direct physical access so that the virtual machine 108 is completely virtualized.

The logic 114 can also be configured to disable direct physical access for the virtual machine 108 and cause a processor 120 to trap whereby a host operating system 110 intercepts input/output signals from a guest 112 and virtual machine operations are virtualized.

The logic 114 executing on the computer 106 can manages virtual machine migration by operating the virtual machine 108 during non-migration time periods by directly accessing physical hardware registers 104 and preparing the virtual machine 108 for migration by revoking direct physical access capability. The logic 114 operates the virtual machine 108 during migration time periods by maintaining full virtualization functionality.

Figure 1B:
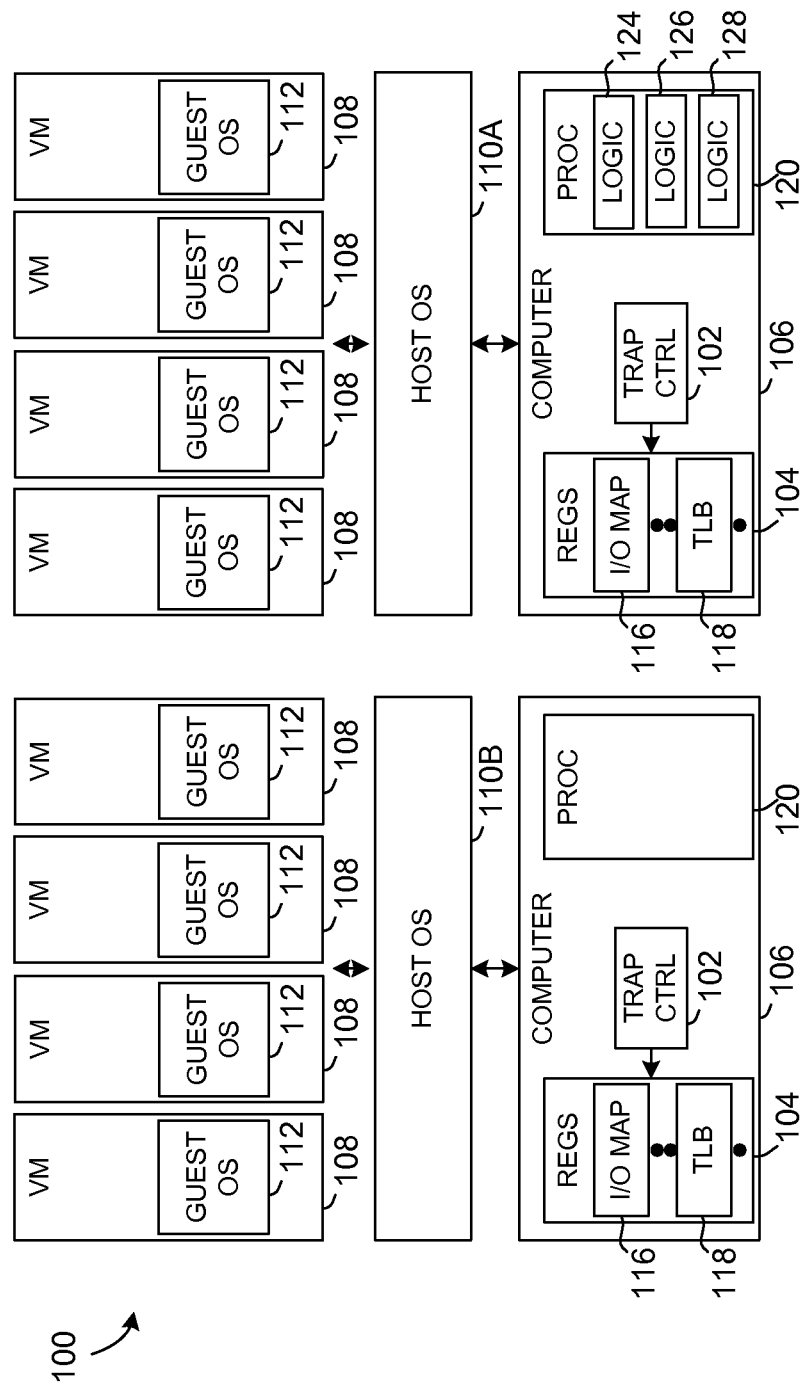

Referring to FIG. 1B, the illustrative technique for virtual machine migration has many uses and applications. For example, a logic 124 executable on the computer 106 can perform maintenance with no Virtual machine downtime by migrating the virtual machine 108 from a first host 110A to a second host 110B, performing hardware maintenance on the first host 110B with direct physical access to hardware, and migrating the virtual machine 108 back from the second host 110B to the first host 110A. Accordingly, zero-downtime maintenance is maintained by migrating the virtual machine, performing hardware maintenance, and migrating the virtual machine back without downtime of the virtual machine.

In another example operation, a logic 126 executable on the computer 106 can optimize physical resource usage by determining a predefined condition of virtual machine inactivity or lower demand, coalescing virtual machines in response to the predefined condition, operating the virtual machines full virtualized with physical devices powered-off, and moving the virtual machines back onto the physical devices and enabling direct physical access for conditions of increased demand.

In a further application, a logic 128 executable on the computer 106 enables tolerance of hardware failures. The logic 128 revokes direct physical access capability of the virtual machine 108 in preparation for migration, then migrates the virtual machine 108 from the first host 110A which executes a host operating system to a second host 110B which executes a guest operating system. The logic 128 detects failure of a hardware component at the host operating system and responds by quiescing functionality of the guest operating system. The logic 128 automatically switches to a hot-spare hardware component and restarts guest operating system functionality.

The illustrative data processing system 100 and associated operating method enable the virtual machine 108 during normal operation associated with non-migration time periods to maintain performance improvement that direct physical access enables. The virtual machine 108 during migration can have direct physical access revoked thus allowing correct migration to occur without susceptibility to logical failure resulting from non-completion of pending or outstanding input/output operations. The direct physical access capability of virtual machines 108 can be implemented to enable data center operations to be optimized because the virtual machine 108 is not tied to a virtual machine host 110 and can be moved to reallocate or free servers to be retired.

The illustrative data processing system 100 and associated operating method further enable the virtual machine guest operating system to have greater tolerance for I/O card failures. For example, the host operating system can detect when an I/O card has failed and respond by quiescing I/O to the guest. The host operating system automatically switches to a hot-spare I/O card, and then restarts the guest. Operating systems that cannot tolerate an I/O error when running natively are thus enabled to tolerate the I/O error when running as a guest.

Figure 2:
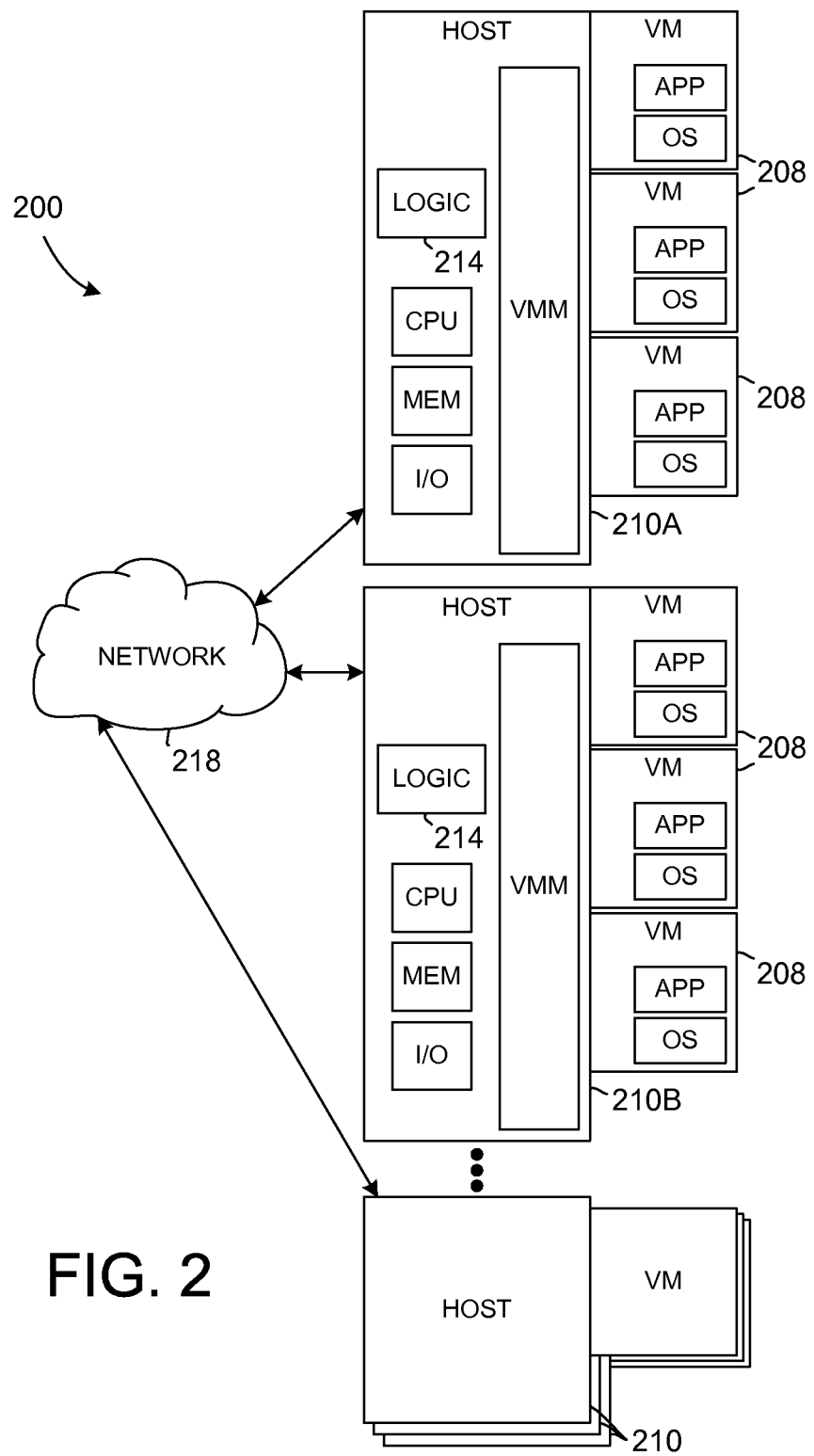
FIG. 2 is a schematic block diagram showing an embodiment of a network system that can implement virtual machine migration with direct physical access control.

Referring to FIG. 2, a schematic block diagram illustrates an embodiment of a data processing system such as a network system 200 that can implement virtual machine migration with direct physical access control. The network system 200 comprises a network 228 and multiple hosts 210 communicatively coupled to the network 228. A virtual machine (VM) 208 is executable on at least one of the hosts 210. Logic 214 is configured to enable migration of the virtual machine 208 from a first host 210A to a second host 210B of the multiple hosts 210 and selectively control enablement and disablement of direct physical access for the virtual machine 208 so that direct physical access for the virtual machine 208 is disabled during migration.

In the illustrative example, the hosts 210 can virtualize multiple virtual machines 208 via a virtualization platform such as a virtual machine monitor (VMM), hypervisor, or the like.

Virtualization enables resources to be shared between multiple virtual machines. The VMM is a software layer that virtualizes and multiplexes available resources of a computer system among one or more guest operating systems on the computer system. The term guest operating system refers to an operating system that the VMM can host. A domain is a running virtual machine within which a guest operating system executes. The VMM may be called a hypervisor to clarify operation at a higher privilege level than the supervisor code of the guest operating systems that are hosted. The terms VMM and hypervisor can be used interchangeably. In various configurations, VMMs can run directly on physical hardware and form an abstraction that is identical to the hardware underneath the VMM or can run as an application on a host operating system.

Figure 3E:
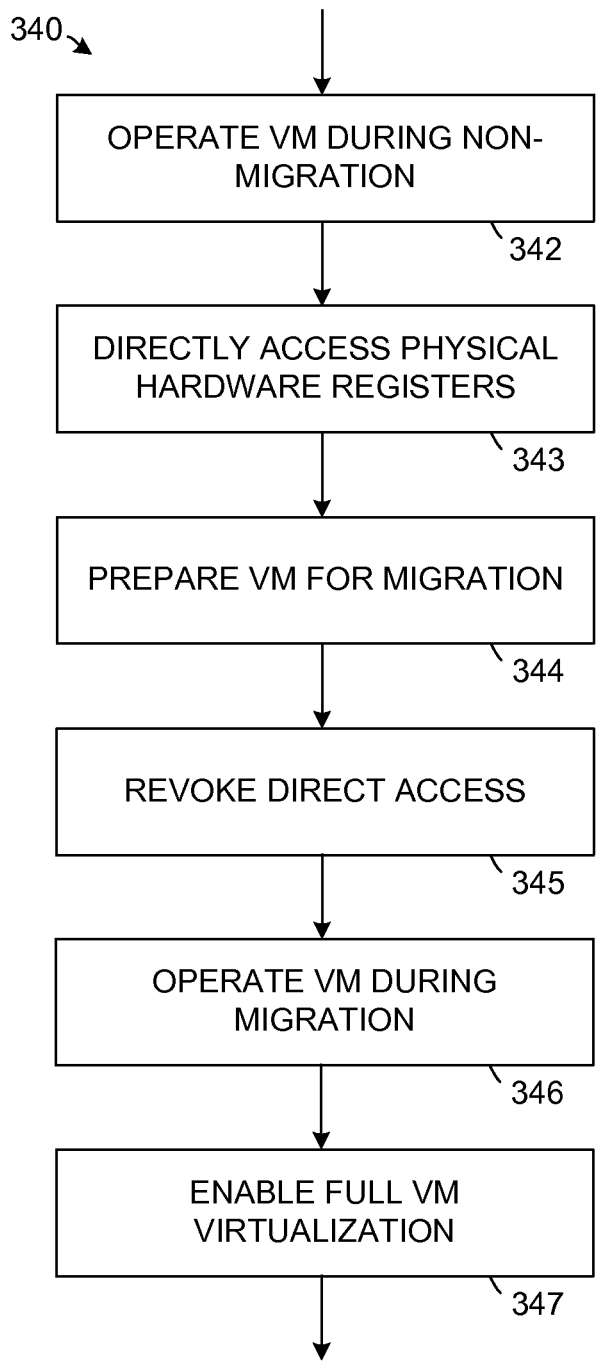

Referring to FIGS. 3A through 3G, flow charts illustrate one or more embodiments or aspects of a computer-executed method 300 that facilitates virtual machine migration with direct physical access control. FIG. 3A depicts a computer-executed method 300 for operating a network computing system. The method 300 comprises operating 302 a virtual machine on multiple hosts and enabling 304 migration of the virtual machine from a first host to a second host of the hosts. Enablement and disablement of direct physical access for the virtual machine is selectively controlled 306 with direct physical access for the virtual machine disabled 308 during migration.

In an illustrative implementation, enablement and disablement of direct physical access of input/output I/O mapping registers and translation lookaside buffer (TLB) page tables for the virtual machine (VM) can be selectively controlled 306.

The illustrative method 300 can be used to enable computer hardware operational control that selects between full virtualization and direct physical access under software control.

Referring to FIG. 3B, a flow chart depicts a computer-executed method 310 for virtual machine control in a data processing system. The method 310 comprises operating 312 a virtual machine for direct physical access, thus attaining substantial performance efficiency in comparison to non-direct control. In conditions for which direct physical access is inappropriate, for example for virtual machine migration, the method further comprises issuing 314 a software request to revoke the direct physical access. In response to the issued software request, hardware is quiesced 316 and direct physical access is revoked 317. The virtual machine can then be completely virtualized 318.

In a particular example, direct physical access can be revoked 317 by actuating disablement of direct physical access for the virtual machine. The method can further comprise causing a processor to trap whereby a host operating system intercepts input/output signals from a guest and VM operations are virtualized 318.

Various functions and applications can be performed based on the illustrative technique for virtual machine migration. For example, referring to FIG. 3C, a method for performing 320 maintenance with no virtual machine (VM) downtime can comprise migrating 322 the virtual machine from the first host to the second host, and performing 324 hardware maintenance on the second host. The virtual machine can be migrated 326 back from the second host to the first host.

In another example application, referring to FIG. 3D, a method for optimizing 330 physical resource usage can comprise determining 332 a predefined condition of virtual machine inactivity or lower demand and coalescing 334 virtual machines when the predefined condition occurs. The virtual machines can be operated 336 fully virtualized with physical devices powered off. The virtual machines can be moved 338 back onto the physical devices, enabling direct physical access for conditions of increased demand.

As shown in FIG. 3E, another example application which is enabled by the illustrative virtual machine control technique is shown. The illustrative method 340 comprises operating 342 a virtual machine during non-migration time periods by directly accessing 343 physical hardware registers. The virtual machine is prepared 344 for migration by revoking 345 direct physical access capability. The virtual machine is operated 346 during migration time periods by enabling 347 full virtualization functionality.

Figure 3F:
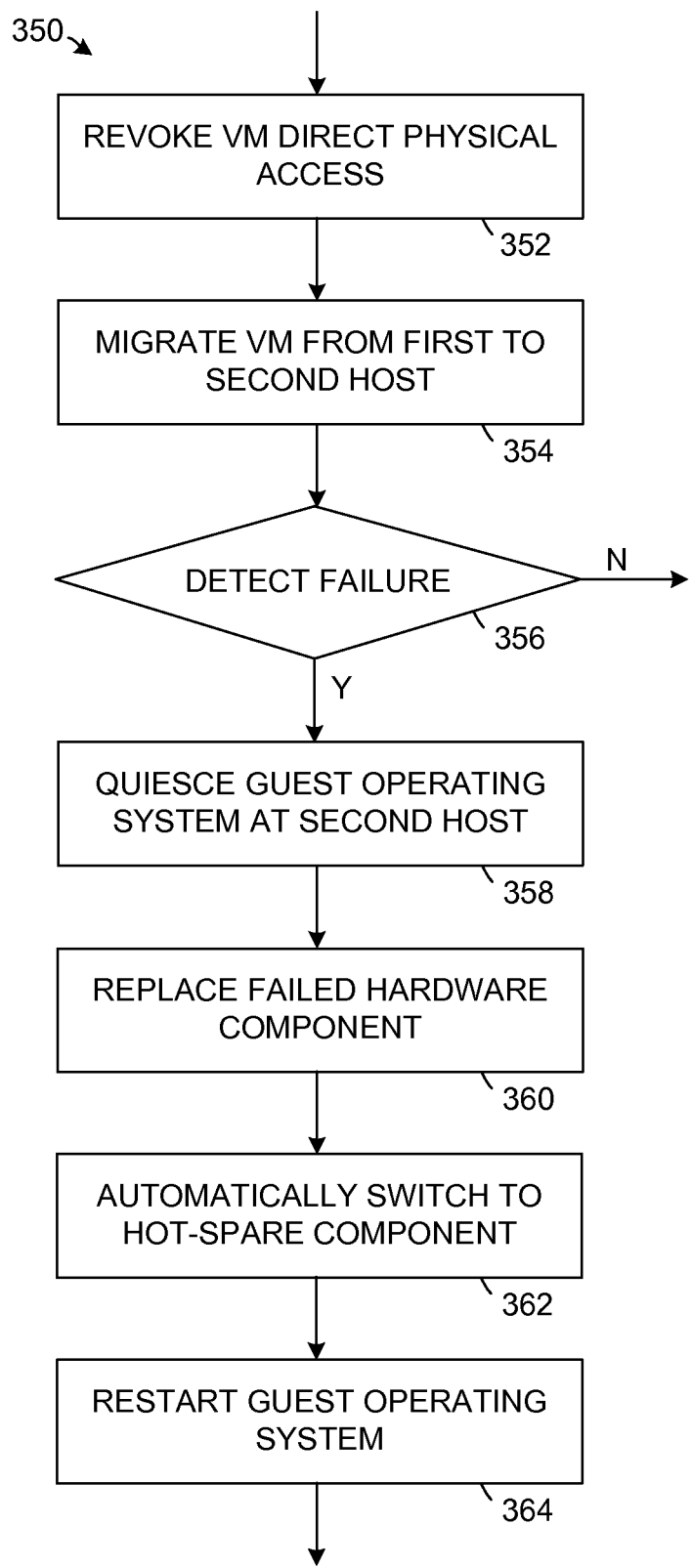

Referring to FIG. 3F, a flow chart shows an embodiment of a method for maintaining 350 a system that is enabled by the technique for controlling virtual machine migration. The illustrative method 350 comprises revoking 352 direct physical access capability of the virtual machine in preparation for migration, then migrating 354 the virtual machine from a first host which executes a host operating system to a second host executing a guest operating system. Upon detection 356 of failure of a hardware component at the host operating system, functionality of the guest operating system is quiesced 358 and the failed hardware component is replaced 360 by automatically switching 362 to a hot-spare hardware component. Guest operating system functionality is restarted 364.

Figure 3G:
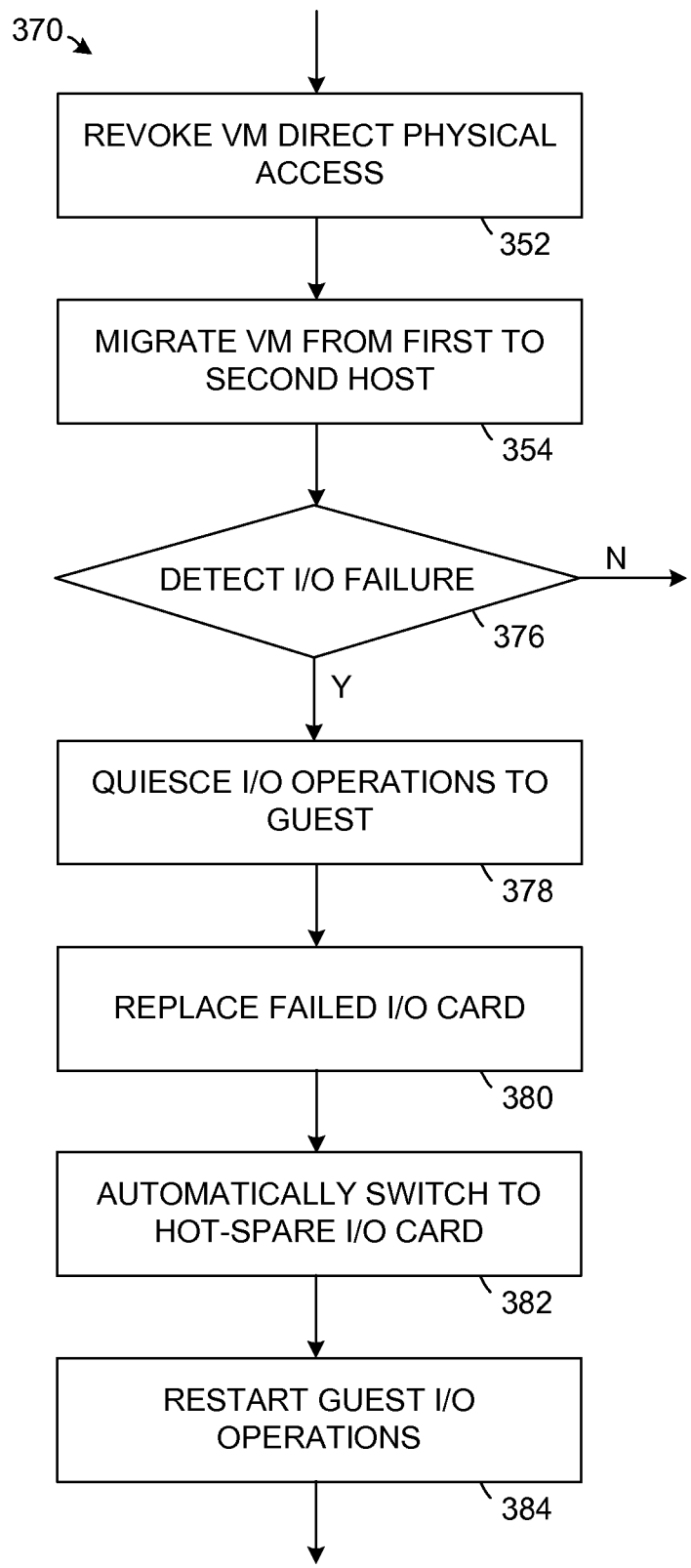

Referring to FIG. 3G, a flow chart shows a more specific example embodiment of a method for maintaining 370 a system that is enabled by the technique for controlling virtual machine migration. Upon detection 376 of failure of an input/output (I/O) card at the host operating system, input/output operations to the guest operating system are quiesced 378 and the failed hardware component is replaced 380 by automatically switching 382 to a hot-spare I/O card. Guest operating system input/output operations are restarted 384.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

The block diagrams and flow charts further describe an article of manufacture comprising a controller-usable medium having a computer readable program code embodied in a controller for managing virtual machines (VMs) in a distributed network system.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A data processing system comprising:
a processor;
hardware registers including input-output (I/O) registers and a translation lookaside buffer (TLB);
a hardware trap control that includes hardware and is software programmable to alternatively,
    cause the processor to allow a guest operating system (guest OS) executing on a first virtual machine (VM) to directly access the hardware registers, and
    cause the processor to trap attempts by the guest OS to directly access the hardware registers so as to disallow direct physical access to the hardware registers by the first virtual machine and so as to fully virtualize the first VM; and logic that programs the hardware trap control to,
    trap attempts by the guest OS to directly access the hardware registers during migration and preparation for migration so that, during migration, the first VM is fully virtualized and continues to operate during migration, and
    allow direct access of the hardware registers by the guest OS when the first VM is not being migrated or being prepared for migration.

2. The system according to claim 1 further comprising:
a plurality of host computers communicatively coupled to each other via a network, the plurality of host computers including a first host computer and a second host computer, the virtual machine being executable on the first host computer and on the second host computer;
the logic being configured to enable migration of the first VM from the first host computer to the second host computer and selectively control direct physical access to hardware registers of the first host computer and hardware registers of the second host computer by the first VM so that direct physical access to the hardware registers of the first host computer and hardware registers of the second host computer by the first VM is disallowed during migration.

3. The system according to claim 1 wherein the logic is configured to quiesce at least some of said hardware registers once direct physical access to the hardware registers has been disallowed.

4. The system according to claim 1 wherein the logic is configured to migrate the first VM from a first host computer to a second host computer, allow direct physical access to hardware registers of the second host computer while maintenance is performed on the first host computer, and migrate the first VM back from the second host computer to the first host computer once the maintenance is complete.

5. The system according to 4 wherein the logic is configured to migrate the first VM from the first host computer to the second host computer while a second VM is executing on the second host computer and in response to a detection of a low demand or low activity condition of the first and second VMs.

6. The system according to claim 1 wherein the logic is configured to prepare the first VM for migration by disallowing direct physical access by the guest OS to the hardware registers, and to operate the first VM during migration time periods while the first VM is fully virtualized.

7. A computer-executed method for operating a network computing system, the method comprising:
allowing, by controlling a first hardware trap that includes hardware using a first software-programmable hardware trap control, a guest operating system (guest OS) executing on a first virtual machine (VM) direct access to at least some hardware registers of a first host computer of said network computing system, the hardware registers including input-output (I/O) registers and a translation lookaside buffer (TLB);
after the allowing, causing, by controlling the first hardware trap using the first software-programmable hardware trap control, a processor to trap attempted direct accesses to the hardware registers by the guest OS;
while direct access to the hardware registers by the guest OS is disallowed, migrating the first VM so that not all the hardware registers used to execute the first VM before the migration are the same as the hardware registers used to execute the first VM after migration, the processor trapping attempted direct access to hardware registers during migration so that the first VM is fully virtualized during migration; and
after the migration, allowing, by controlling the first hardware trap or a second hardware trap using the first software-programmable hardware trap control or using a second software-programmable hardware trap control, direct access to at least some of the hardware registers by the guest OS.

8. The method according to claim 7 wherein the migration is from a source host to a target host, and the trapping results in only memory which is used being copied to the target host during migration.

9. The method according to claim 7 further comprising, after the disallowing, quiescing at least some of the hardware registers.

10. The method according to claim 7 further comprising: migrating the first VM from the first host computer to a second host computer; performing hardware maintenance on the first host computer; and migrating the first VM back from the second host computer to the first host computer.

11. The method according to claim 7 further comprising:
detecting virtual machine inactivity or lower demand of the first and a second VM, wherein the migrating of the first VM is to a second host computer on which the second VM is executing and in response to the detecting virtual machine inactivity or lower demand;
operating the first VM fully virtualized on the second host computer with at least some of the hardware registers powered-off; and
migrating, in response to a detection of conditions of increased demand, the first VM back onto the first host computer and enabling direct physical access to the hardware register by the guest OS.

12. An article of manufacture comprising a controller-usable non-transitory medium encoded with computer readable program code to, when executed by a controller:
allow, by controlling a first hardware trap that includes hardware using a first software-programmable hardware trap control, a guest operating system (guest OS) executing on a virtual machine (VM) direct access to at least some hardware registers of at least one computer of a network computing system, the hardware registers including input-output (I/O) registers and a translation lookaside buffer (TLB);
after direct access is allowed, causing, by controlling the first hardware trap using the first software-programmable hardware trap control, the hardware trap to trap attempts by the guest OS to access the hardware registers so as to disallow direct access to the hardware registers by the guest OS;
while direct access to the hardware registers by the guest OS is disallowed, perform a migration of the VM so that not all the physical resources used to execute the VM before the migration are the same as the physical resources used to execute the VM after migration;
during the migration, causing the first hardware trap to trap attempts by the guest OS to access the hardware registers so that the VM is fully virtualized; and
after the migration, allow, by controlling the first hardware trap using the first software-programmable hardware trap control or a second hardware trap using a second software-programmable hardware trap control, direct access to at least some of the physical resources by the guest OS.

* * * * *

UNITED STATES PATENT AND TRADEMARK OFFICE
CERTIFICATE OF CORRECTION

PATENT NO.        : 9,032,397 B2
APPLICATION NO.   : 12/128511
DATED             : May 12, 2015
INVENTOR(S)       : Miller et al.

Page 1 of 1

It is certified that error appears in the above-identified patent and that said Letters Patent is hereby corrected as shown below:

In the claims

Column 6, line 67, Claim 2, delete "second." and insert -- second --, therefor.

Column 7, line 20, Claim 5, delete "to" and insert -- to claim --, therefor.

Column 8, line 16, Claim 11, delete "virtual." and insert -- virtual --, therefor.

Signed and Sealed this
Twenty-seventh Day of October, 2015

Michelle K. Lee
*Director of the United States Patent and Trademark Office*